(12) United States Patent
Andriotis et al.

(10) Patent No.: US 10,878,177 B2
(45) Date of Patent: Dec. 29, 2020

(54) TECHNIQUES FOR STEREOSCOPIC ONLINE WEB CONTENT CREATION AND RENDERING

(71) Applicants: Dimitrios Andriotis, Athens (GR); Ioannis Paliokas, Salonika (GR); Athanasios Tsakiris, Salonika (GR)

(72) Inventors: Dimitrios Andriotis, Athens (GR); Ioannis Paliokas, Salonika (GR); Athanasios Tsakiris, Salonika (GR)

(73) Assignee: EQULDO LIMITED, Nicosia (CY)

( * ) Notice: Subject to any disclaimer, the term of this patent is extended or adjusted under 35 U.S.C. 154(b) by 0 days.

(21) Appl. No.: 16/253,146

(22) Filed: Jan. 21, 2019

(65) Prior Publication Data

US 2019/0171695 A1 Jun. 6, 2019

Related U.S. Application Data

(63) Continuation of application No. 15/622,012, filed on Jun. 13, 2017, now abandoned, which is a continuation of application No. 14/105,998, filed on Dec. 13, 2013, now Pat. No. 9,678,929.

(51) Int. Cl.
*G06F 40/14* (2020.01)
*G06T 11/60* (2006.01)
*G06T 15/20* (2011.01)
*G06T 19/00* (2011.01)
*H04N 13/261* (2018.01)

(52) U.S. Cl.
CPC ............. *G06F 40/14* (2020.01); *G06T 11/60* (2013.01); *G06T 15/20* (2013.01); *G06T 19/00* (2013.01); *H04N 13/261* (2018.05)

(58) Field of Classification Search
CPC ....... G06T 19/00; G06T 15/405; G06T 15/20; G06T 7/0075; G06T 11/60; G06K 9/18; G06K 9/222; G06F 8/30; G06F 8/33; G06F 8/71; G06F 8/52; G06F 8/40
See application file for complete search history.

(56) References Cited

U.S. PATENT DOCUMENTS

| | | | |
|---|---|---|---|
| 2004/0100489 A1* | 5/2004 | Berestov | G06F 16/9577 715/738 |
| 2011/0161843 A1* | 6/2011 | Bennett | G06F 3/14 715/760 |
| 2013/0090101 A1* | 4/2013 | Park | G06F 3/147 455/414.3 |

* cited by examiner

*Primary Examiner* — Ke Xiao
*Assistant Examiner* — Andrew Shin
(74) *Attorney, Agent, or Firm* — Franco S. DeLiguori; DP IP Group

(57) ABSTRACT

Improved techniques are presented for generating stereoscopic image of 2D web pages. In accordance with an exemplary embodiment, a stereo-enhancing annotation tool is provided and used to generate intermediate HTML source code. The intermediate HTML source code—together with the normal HTML code that is served when a user's browser makes a URL call—are used by a computer processing unit to generate stereoscopic images. Algorithms optimize the look and feel of stereoscopically-imaged web-page content using a number of known presentation optimized parameters that are automatically determined based on a priori assumptions of depth cues.

20 Claims, 12 Drawing Sheets

TECHNIQUES FOR STEREOSCOPIC ONLINE WEB CONTENT CREATION AND RENDERING

RELATED APPLICATIONS

This application is a continuation of pending application Ser. No. 15/622,012, filed on Jun. 13, 2017, which is a continuation of application Ser. No. 14/105,998, filed on Dec. 13, 2013, now U.S. Pat. No. 9,678,929, commonly owned and assigned to the same assignee hereof.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to online web content creation and rendering.

BACKGROUND

While 3D and stereoscopic technologies are becoming more and more ubiquitous, content creation is limited to a non-critical mass of stereo movies and video games. The stereoscopic display of HTML pages onto stereo-enabled TV screens (3DTVs) and computer monitors, to produce a 3D-like visual reality from 2D environments, and in particular, from 2D web pages, has not caught on.

A stereoscopic image presents the left and right eyes of the viewer with different perspective viewpoints, just as the viewer sees the visual world. From these two slightly different views, the eye-brain synthesizes an image of the world with stereoscopic depth. You see a single—not double—image, since the two are fused by the mind into one which is greater than the sum of the two. So called 3D computer-generated images produced from a three-dimensional source file require the computation of an image from a single perspective point of view or location in space. A stereoscopic image differs only in that the image must be generated from two locations. Hence, the terms "3-D" or "three-dimensional", particularly as used in the field of computer graphics, is used to refer to a "realistic"-looking image which may be appreciated with one eye. The usual so-called 3-D computer image loses nothing when you close one eye. A true stereoscopic image on the other hand loses its intended essence of expression when viewed with one rather than two eyes. The creation of stereoscopic images, and in webpages, in particular, is the subject matter of this application.

There are a number of known techniques for converting images (either 2D images or actual 3D images designed for single perspective point of view) to stereoscopic images. Few examples include: 1) Manual shifting of objects in horizontal axis using digital image processing software like PhotoShop, 2) The DBIR method (Depth-Based Image Rendering) where apart from 2D images an extra depth map is used to calculate the shifting, 3) Semi-automatic and user-guided variations of the above methods where designers try their best to mark depths in a perceptually consistent way, 4) Multiple 2D shoots on the same scene with various focal distances in order to find a correlation between the stereoscopic depth and the amount of blur over the surfaces, 5) Techniques specific to captured content and not computer synthesized like the use of special hardware to measure the depth using bounced infra-red light off of objects read in by a common camera, 6) Stereo Rigs used in cinematography and which is not useful at all in the web content creation.

Computing a stereoscopic image involves drawing two monocular viewpoints from different positions and creating dual 2D images. It is also possible to generate a stereoscopic image from a true 3D image.

When a computer browser retrieves a webpage, it does so with the intent of decoding the HTML code to generate an image. This image is traditionally 2D, but if the page is designed especially for viewing on a 3D monitor, the display of the content will appear in 3D. Alternatively, if the web site content is normal 2D but the monitor has the hardware and/or software capability to convert an inbound 2D image of a website page, for example, to a 3D single perspective image, then it does just that.

Conventional techniques for displaying content stereoscopically (or "in stereo", for short) employ various known techniques, such as creation of anaglyph images from 2D content. That is filtering the left and right images using chromatically different color filters,—where the two filters should have contrasting colors based on the Trichromacy Theory—and superimposing them into one image to be seen by anaglyph glasses.

Another approach for stereo content creation is to employ complex algorithms that analyze a web page—as a sequence of images—using complex graphics processing units (GPUs) that run performance limiting data crunching solutions that operate to generate 3D content from 2D images. To achieve this, web content is analyzed to identify objects. These objects are then manipulated to appear as 3D viewable pages on a 3D monitor or television, using the appropriate 3D glasses.

Another recent approach that has been proposed is the introduction of features or function calls into the HTML code, by web content creators using extensions of Cascade Style Sheets (CSS), and in particular CSS3. In this regard, CSS3 introduces the ability of website creators to dictate a priori how a website shall appear when projected onto a 3D viewable area or screen. This method is designer-driven, requires a website remake and cannot by applied to the existing web without extra costs.

What are needed are new approaches by which to generate stereoscopic images of 2D web pages.

SUMMARY

Improved and new techniques are presented for generating stereoscopic image of 2D web pages. In accordance with an exemplary embodiment, a stereo-enhancing annotation tool is provided and used to generate intermediate HTML source code. The intermediate HTML source code—together with the normal HTML code that is served when a user's browser makes a call to a particular active IP—are used by a computer processing unit to generate stereoscopic images that comes as a result of a webpage rendering into sequences of images. Algorithms optimize the look and feel of stereoscopically-imaged web-page content using a number of known presentation optimized parameters that are automatically determined based on a priori assumptions of depth cues.

The intermediate HTML source code is produced depending on properties and arithmetic values defined from a known set of stereo annotated convention rules.

In one scenario, a stereo plugin, installed in a user's end device, translates stereo-enriched source code into a stereo projected web page by producing different images for the left and right eye (left and right channels) in a dynamic manner (dynamically changed visual content).

In another approach, web authoring tools are expanded to include special IDs or tags which may be used to create stereo annotated source code. This stereo annotated source code is simply further HTML instructions included directly into the "normal" HTML source code, which when served to a browser allow images and web pages stored in 2d to display stereoscopically when projected onto a 3D device.

In another approach, the stereo annotated source code is transferred as valid HTML content by existing internet protocols.

DETAILED DESCRIPTION

Figure 1:
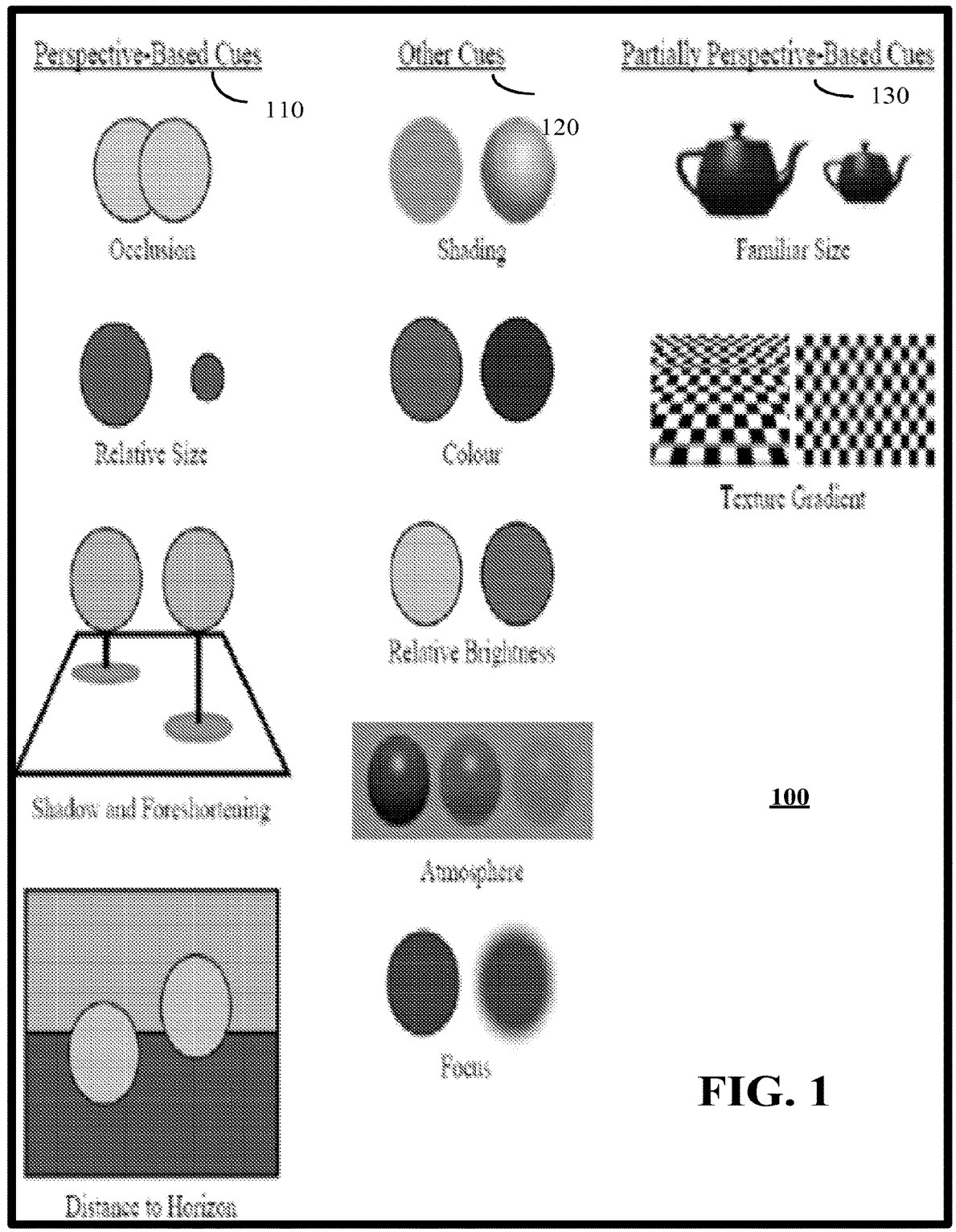
FIG. 1 is graphical representation showing well established relationships between a variety of depth cues.

The word "exemplary" is used herein to mean "serving as an example, instance, or illustration." Any embodiment described herein as "exemplary" is not necessarily to be construed as preferred or advantageous over other embodiments. It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "an apparatus" or "a device" includes one apparatus or device as well as plural apparatuses or devices.

The present disclosure is directed to the rendering, by web browsers, of stereoscopic webpages (SWPs). SWPs differ from both 2D and 3D rendered webpages or images.

A webpage that is projected in 2D possesses no depth cues and is intended to be viewed as a flat image with both eyes.

In conventional computer graphics rendering, a graphics processing (GPU) generates 3D graphical image representations from a single point of view (e.g., mono view). This single point of view may mean a single image that is viewable by both the right eye and the left eye of a viewer. Hence, when a GPU renders a 3D image of a webpage normally designed for display in 2D, it must analyze the image to identify and assign monocular cues to objects on the image to create a three-dimensional monocular perspective.

Monocular depth cues include, for example, light and shade, relative size, interposition, textural gradient, aerial perspective, motion parallax and, most importantly, perspective.

A SWP that is rendered as proposed herein differs from both 2D and monocular 3D rendered web pages, in that there are dual images generated to achieve stereoscopic view. The term stereoscopic view refers to webpage images rendered from a binocular point of view. The rendering may be done by a browser directly, or with the assistance of an accompanying tool (such as a browser plug-in), or rendered remotely from a server and merely locally interpreted by the browser. In a binocular point of view, there may be two images, where one image is viewable by one of the eyes and not the other, and vice versa. The binocular point of view and stereoscopic view are herein used interchangeably.

The present disclosure introduces a new methodology for the creation and the displaying of HTML pages as SWPs, i.e., in stereoscopic view. SWPs are intended for display onto stereo-enabled TV screens (3DTVs) as well as computer monitors.

The fact remains that while 3D and stereo technologies are becoming ubiquitous, the availability of content that is generated for audience consumption remains very much still 2D. This is particularly so for webpages.

The only exception is the production of a handful of stereo movies and a line of video games popular with younger adults. Mainstream content consumers, and business professionals, have very little access to content in non-2D.

More recently, a number of online platforms began promoting the automatic rendering of SWPs from either predefined 3D content or from initial 2D static web page content which was prepared for stereo projection manually. Unfortunately, many of the tools employed to do the rendering rely on obsolete technologies and/or the creation of anaglyph images to present stereoscopic content to users.

It appears that the predefined 3D content rendering involves having a developer built-site that is optimized for stereoscopic viewing. Alternatively, a low-quality digital image processing is used to analyze the image and create dual images for stereoscopic viewing when called by a browser and displayed on a 3DTV or like computer monitor.

Another approach that has been suggested is for webpage developers to create webpage content using extensions that take advantage of the new functionality in Cascade Style Sheets 3(CSS3) to make it possible for modern browsers designed to interpret CSS3 and HTML5 instruction tags to generate SWPs.

The prior art techniques all suffer from one or more significant drawbacks when it comes to browser rendering of SWPs.

Any solution that requires a webpage developer familiar with CSS3 to possess understanding and familiarity with spectroscopic theory and stereo content rendering in order to design a SWP is unlikely to lead to many sites being produced.

Furthermore, any solution that requires the hundreds of millions of sites out there to have to be redesigned to function as SWPs is also not a commercially viable approach. Also, it is undesirable to require users, some of who may not possess the right software and/or hardware functionality to enjoy SWPs, to not be able to view the same webpages in 2D.

Any approach that requires special graphics processing software to create SWPs from 2D or 3D content is further undesirable.

Also, with the proliferation of portable computers which are battery-limited and power source constrained, approaches that utilize excessive CPU and memory resources are often also considered commercially not viable.

A proposed approach for creating and rendering SWPs will now be described below in connection with FIGS. 1 to 11.

The presently proposed approaches overcome one or more of the drawbacks described above.

In one approach, 2D webpages are received by the browser and converted directly to SWPs. As such, the requirement to have a webpage developer familiar with CSS3 and/or understanding and familiarity with spectroscopic theory in order to generate in advance either the images or CSS3 instructions to the browser which will achieve a SWP-like result is eliminated.

Because at least one of the proposed approaches does not require existing sites to be redesigned, seeing as SWPs are generated in real time, the redesign problem is also overcome.

A further attribute of the proposed approach is the fact that the 2D webpage rendering of SWPs may be completely user selectable. This addresses the challenge of a user not possessing the right software and/or hardware functionality wanting to view 2D webpages in their normal form.

A yet further benefit of the proposed solution is that the newly introduced functionality for rendering 2D webpages into SWPs involves the application of a set of instructions or rules that identify and assign binocular depth cues to HTML elements.

The process requires very little processing or memory to achieve this and is in this regard superior over any known or proposed technique. The efficient and limited constraint on resources is particularly advantageous in applications such as laptops, tables, smart phones and like portable, battery-powered devices.

A further differentiation of the proposed approach is in providing users with the ability to select between defaults actions in the creation of the SWPs, or in user-selected settings which define the rules to be employed by the tool in creating the SWPs. One such feature may include the ability to identify and turn off advertising. Another is the ability to display alerts and other information in graphical form using macros built in to the tool. For example, a site that was just downloaded may not only itself appear in stereo, a flying cookie may be made to float across the screen to show that the site just inserted a "cookie" into one's computer. Any number of similarly predefined macros could be made available to the user all aimed to enhance the user experience and hence the desire to view the web in stereo.

Of course, one user defined setting includes control over being able to deactivate SWP rendering. In one scenario, it is further contemplated being able to reverse render SWPs in 2D, even when the original page was generated as an SWP. To do this, the tool must be able to analyze HTML elements and remove depth cues and any other extraneous information which is normally associated with SWP rendered imaging.

Additionally, another benefit of the present solution is that it is easily scalable to be compatible with existing and future web browsers and 3DTVs, as well as existing and future Virtual/Augmented Reality equipment like optical head-mounted display—OHMD) (e.g., Oculus Rift, Meta AR Glasses, etc.).

In a related approach, depth cues are assigned and weighted based on extraneous factors.

In one scenario, depth cues are user defined. In an alternate scenario, the depth cues are assigned a priori based on parameters and values which rely on physiological and/or psychological realities.

In another scenario, depth cue values are assigned based on the ergonomic or physical environment (such as user distance from computer or monitor, the size and type of monitor, the size and type of binocular glasses worn by user, room lighting conditions, background environment, and the like).

In a further approach, functionality is provided that allows changing site background colors, eliminating advertisements or other non-critical information, as well as physical dimensions of HTML elements to achieve a best SWP experience. It should be noted that it is rather easy to follow future technological trends (e.g. extremely high definitions) as the method can be applied with minor changes to existing and future standards.

In yet a further scenario, the software solution includes an advertisement creation tool that automatically generates or replaces advertisements on the 2D originating webpage, and/or moves advertisements closer or further way based on default criteria or on the basis of user selections.

It is further contemplated that the capability of the tool to change depth cues of HTML elements, as proposed herein—whether performed by a browser with built in functionality, or by a separate browser plug-in, or in any other related ways described below—is employed to provide a new mechanism for monetizing the display of web-page content, including search results by sites such as Google, YAHOO, and others.

For example, it is envisioned that companies like GOOGLE, in generating search result pages, may generate search results with the intent that when converted to SWPs, certain links or other HTML elements will have been assigned a monetization value that take into account the visual and therefore psychological effects of position and depth of an SWP.

The expected proliferation of SWPs and use of 3D glasses to surf the web will eventually result in companies generating SWPs directly using the proposed approach or an equivalent variant herein due to its simplicity. The present approach expands monetization opportunities for entities selling or promoting goods and services on the web, and in particular, for companies like GOOGLE, YAHOO and others that generate revenue primarily from selling (to advertisers) access to eyeballs of users surfing the web.

From an advertising and monetization perspective, associating depth cues with placement of advertisement, among other things, creates a new and very lucrative revenue generating capability for advertisers and their promoters (e.g., GOOGLE, YAHOO). It also provides a new way to reach consumers with better targeted advertising, a better customer experience, a wider range of incentives not possible through 2D webpages, as well as revenue schemes that take advantage of the psychological effectiveness of the use of color, motion, lighting, background, and sound which when further combined with depth cues can be used to define and/or adjust fees charged to advertisers; in a manner analogous to GOOGLE charging advertisers higher for the privilege of appearing higher on search results in the current typical 2D webpage environment.

The binocular nature of SWPs results in the creation of dual images. These images may be separated in time as well as space, in a manner which may further give rise to additional monetization opportunities and mechanisms that take advantage of timing differentiation and psychological effectiveness of advertisements in encouraging buyer behavior. This is further described below in connection with FIG. 12.

The proposed approach employs, newly created HTML or HTML-like language tags (hereafter "stereoscopic indicators") which function as an extension to the existing HTML or HTML-like descriptor language that is used to create a 2D webpage.

The proposed solution, in a first exemplary embodiment form, consists of two separate programming modules. Either or both of these modules may exist as separate and distinct functional blocks which are called by the browser during a 2D-to-SWP rendering. In another approach, either or both modules are configured as browser-integrated functioning blocks.

In a first scenario, the first module is configured to receive—as its input—the HTML source code of any browser-retrieved 2D webpage. The second module is configured to take the output from the first module and to generate the dual images (i.e., the SWP) corresponding to the stereoscopic view of the input 2D webpage.

In normal operation, a browser retrieves a web-page in response to a user typing the associated URL associated with a particular website or webpage he/she desires to view or access. It is to be understood that the process of how browsers operate is well known and beyond the scope of this invention. It is further to be understood that HTML is but one form of mark-up languages used to create webpages, and that for purposes of this invention, any mark-up language or like browser-interpretive language that is equivalent in function or operation to HTML is, for purposes of this disclosure, deemed and intended to be equivalent.

Next, when a browser retrieves a webpage (typically from a remote server), it receives as input back from that server the HTML source code associated with the URL corresponding to the normally 2D webpage.

As a further next step following the retrieval of this source code, the first module scans the code to identify relevant tag elements therein. Once these elements are identified, the stereoscopic indicators ("SI's")—explained in greater detail below—are retrieved and applied to the identified tag elements. The result is the creation of an intermediate source code which embodies both the old tags and the new tags (i.e., the SIs).

The second module includes an extended browser-interpretive language (hereafter the "extended source code instruction set") which is configured to receive and process the intermediate source code generated by the first module, and based on construction rules explained below, interpret the old and new tags in the intermediate source code to generate the dual images of the SWP corresponding to the 2D webpage retrieved from the remote server by the browser.

Thus, the proposed methodology first generates an intermediate source code and uses an extended source code instruction set to generate the SWP rendering.

In short, normal HTML source code downloaded from a web server is used to dynamically generate the intermediate source which will in turn form the basis of what the user will see as a SWP on his local "end" device (e.g., a 3DWebTV or Computer).

In accordance with an exemplary embodiment, the intermediate code is produced taking into account a set of predefined convention rules (i.e., properties and arithmetic values) which are associated with depth cues, as well as other physiological, psychological and other stereo-relevant attributes. The rules define values for the stereoscopic indicators which values in turn shape the aesthetic expression of the SWP that is to be generated.

In one scenario, the first and second modules are in the form of a browser plug-in (or "add-on"). This plug-in, when installed in a user's end device, is further configured to generate an SWP by producing different moving images for the left and right eye which get transmitted over separate left and right communication ports to the viewing area of polarized glasses, or directly to a 3DTV monitor in an interlaced or related matter for viewing using the appropriate stereo glasses.

In an alternative approach, the intermediate source code is written by web designers using as a design language the enhanced features of the SIs which are incorporated in the webpage design. When the user browser detects that the webpage code is already in intermediate source code form, the first module functionality is either bypassed, or partially enabled to adjust the look and feel of the intermediate source code to match user preferences.

The following is a short exemplary description illustrating one approach for generating intermediate HTML source code.

To start, the present approach involves identifying and stereo tagging HTML elements (e.g., <div></div>) which are to be enriched with stereo information. A code section which we refer to as 'stereo' is created, in the encoding process, and is critical differentiating element between the normal code and the intermediate source code, the latter being the code that the extended source code instruction set will ultimately decode to generate the appropriate left and right renderings of the SWP. The very simplicity, speed and manner in which the translation occurs from 2D to SWP results in neither visual or aesthetic side effects, distortions, noise or other noticeable artifacts.

For browsers in which the stereo plug-in has been installed, as well as for the stand alone stereo web browser, the stereo information enables the stereoscopic view and provides the stereoscopic (z-index) depth of the element.

TABLE 1

Stereoscopic identifier tags and descriptions.

| Stereo tag | Description | Data |
|---|---|---|
| stereo | Declares that the parent (container) of the holder is a stereo enriched HTML element | Holds a set of directives (commands) together with numerical values as the following |
| zindex | Stereoscopic depth (in units) | Integer value |
| zpp | Zero Parallax Plane | An integer value which declares the Zero Parallax Plane if not zero. |
| step | The stereoscopic step | A float number (real number) which indicates the minimum distance between two consecutive stereoscopic planes. |

The above table (Table 1) shows the reserved keywords (the stereo directives) which describe the type of the corresponding information in accordance with an exemplary embodiment. In the event a previous HTML extension is not used, it is proposed to render the existing HTML content by dynamically allocating a stereoscopic depth in each of the discrete HTML elements based on user preferences. In one scenario, these preferences are saved in an ASCII file and loaded into computer memory each time a webpage is marked as stereo-enriched.

For example, a user may wish for hyperlinks on a page to be visible at the lowest depth (very close to a user's eyes). In the same example, the zindex property (defined in Table 1), for the case of a hyperlink will have a hint label that will automatically be set to the minimum stereo depth unit, which in the present example is value "1".

Each time the cursor triggers an On Mouse Over event of a hyperlink (<a> . . . </a> HTML element), a hint label will be projected above of all other elements of the HTML scene.

In the event of a SWP predefined webpage, where the web-creator selected a setting which is different than the user settings, the user settings may be assigned a higher priority to force a change in the associated SI values. Of course, it is envisioned that certain web-creator defined fields may be locked by the web creator to prevent a change. This may be necessary for example to preserve the overall look and feel of a page, protect or preserve the author's IP rights as regards the use of logo's marks, etc., or to prevent, for example, changes to content, such as removal of advertising banners, product codes, advertising word links, changes in tracking IDs, and the like.

It should be noted that stereoscopic depth assigned values are in part a function of other HTML elements in the same ancestor/family HTML element tree structure.

Following this approach, the child element (e.g. a <form> element inside a <div> element) shall appear to be in the stereo depth distance that results if the depth of the parent is added to the depth of the child. The same result is applied to all the siblings of the element (i.e., HTML elements that have the same parent element).

The following listing is an example intermediate source code presented to show one way to stereoscopically annotate normal code of an image (inside a div).

```
" <stereo stereostyle="zindex=3; zpp=1; step=5">
    <div id="LogoImage" class="style1">
    <img src="images/Logo.png" alt="Logo" style="margin-right:8px"/>
    </div>
    </stereo>"
```

As can be appreciated, the stereo annotated HTML code is automatically transformed into an intermediate HTML source code. This intermediate code differentiates the HTML code targeted at the left channel from the HTML code targeted at the right channel. This process is plug-in internal and non-visible to web developers or web clients.

The dual intermediate HTML code renderings are rendered using common HTML rendering routines in order to produce a pair of two images, one for each stereo channel. The differences between the two rendered HTML pages are responsible for creating the stereo effect on the end user's 3DTV or Computer Monitor.

The automatic intermediate HTML source code creation was described earlier as a client-side process, but it could also be mounted in the server-side. Where this is the case, the end user's plug-in downloads directly the dual image pair of intermediate source code files (could be one file as well) from the server and executes them locally.

The intermediate HTML source code is produced by series of computer functions which implement a number of depth cues. The following section describes in more detail which depth cues are implemented in the proposed method, in what order and how each HTML element is altered by the corresponding computer functions.

Implementation of Depth Cues and Stereo Web Document Degradation

It is commonly known and understood that the psycho-sensory factors that influence stereo perception in humans is based on spatial properties generally referred to as depth cues. The present approach taps the power of depth cues, and the physiological and psychological attributes associated with depth cues generally, to develop a superior SWP experience taking advantage of correlations between the human visual system and the way in which the mind interprets depth in HTML elements. The process gives emphasis on Binocular depth cues, which require both eyes to be open, in contrast with Monocular depth cues which do not.

FIG. 1 is graphical representation showing well established relationships between a variety of depth cues 100. These depth cues play a role in stereo image projection. The present approach takes advantage of these relationships. One exception is that of Monocular Movement Parallax since at issue is the need to generate SWP which involves stereoscopic viewing (which requires that both eyes be open).

For illustration purposes, depth cues 100 are separated into three categories: (i) perspective based depth cues (110), (ii) partially perspective-based depth cues (130), and (iii) other type of depth cues generally (120).

Figure 2:
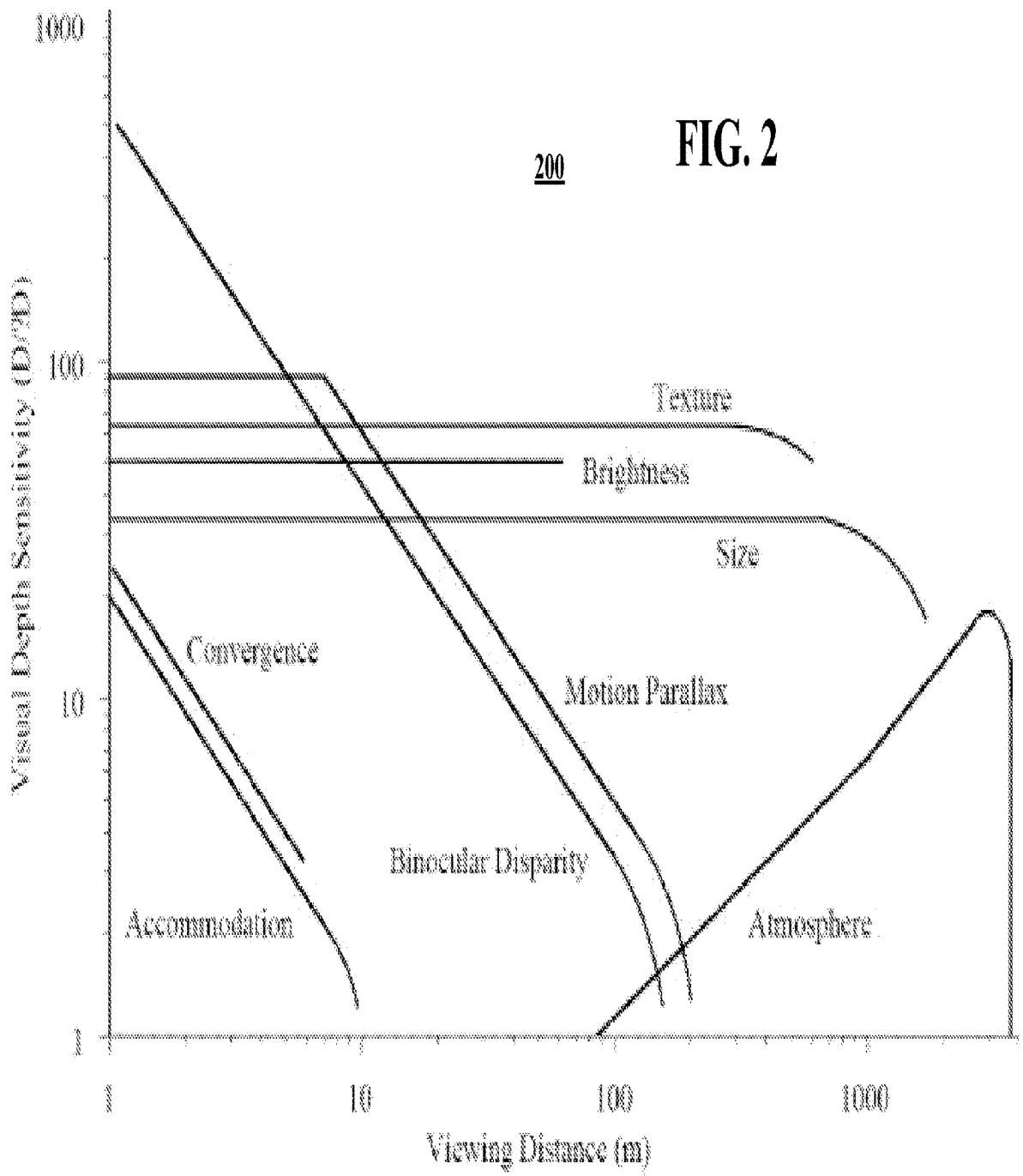
FIG. 2 is a chart showing well established relationships in the effectiveness of depth cues as a function of distance.

FIG. 2 is a chart 200 showing well established relationships in the effectiveness of depth cues as a function of distance. The present approach utilizes the fact that certain depth cues provide more meaningful depth perception (and thus a more aesthetically effective result) than do other depth cues for a given distance or range of distances from that of the human eye.

In an exemplary embodiment, the creation of an intermediate source code involves selecting a subset of possible depth cues to utilize in defining the level of desired stereo-enrichment to be achieved as an end result. For this, drawing on FIG. 2, it can be seen that depth cues can be ranked in terms of importance in so far as ultimate effect on viewer depth sensitivity measured as a function of viewing distance.

In the case of a computer monitor, which is typically set at a distance somewhere between 70 and 80 cm from a user's eyes, we see from the graph in FIG. 2 that the vertical section cuts the horizontal axis at the left most point. In other words, the depth cue associated with Binocular Disparity appears to be of the highest significance, in terms of viewer depth sensitivity at a viewing distance from eyes to a computer monitor.

Each depth cue corresponds to a function written in computer language. Each function takes as input a given HTML element at run time (on the fly) and gives as output a new copy of the initial element but changed in certain properties.

In accordance with the exemplary approach, each individual HTML element is weighted as follows:

After the initial HTML source code has been downloaded into computer's memory, it is impended and tokenized into a tree of elements where each one belongs to a stereo depth. Because HTML elements and 2D web content in general are not three dimensional by nature, the present approach is to assign a zindex length measured from a user's eye to the screen. The negative parallax is responsible for making things visible inside the "volume" bordered by the projection screen (3DTV or computer monitor) and the user's eyes. The zindex of each individual HTML represents the stereo depth in this volume.

Finally, following known stereo geometry theorems, an algorithm (first module) calculates a horizontal relocation of the HTML elements as a function of associated stereo depth. This horizontal relocation, measured in pixels, practically implements the Binocular Disparity depth cue described earlier.

The next step in this pipelined procedure is to call the next most important depth function in respect to the corresponding depth cue. Depending on the distance to the monitor depth function order may slightly change. Finally, each depth function delivers an altered copy of the HTML element to the following until the list of available depth cues get empty.

For each HTML element, a list of depth cues is filled up during processing. Not all depth cues can be applied to all kind of HTML elements, but this is not the challenge. For example, in the case of an <img> element (image element) the list could include the following depth cues: [Binocular Disparity, Relative Size, Relative Brightness].

At first, the function of Binocular Disparity will take the initial HTML element and will change its position in relation to the eye (left or right) and distance in the stereo axis.

The Binocular Disparity function is removed from the list.

Next, the Relative Size function will change the width and height of the image. Next, the relative brightness will alter the colours accordingly. Finally, when all depth functions will have completed, the HTML element will be projected among other HTML elements in the webpage. At the final stage, a separate function which works like a real estate agent will reserve space for each new coming HTML element in order to give coherence in the overall result. HTML elements need to be presented as a whole.

Figure 3:
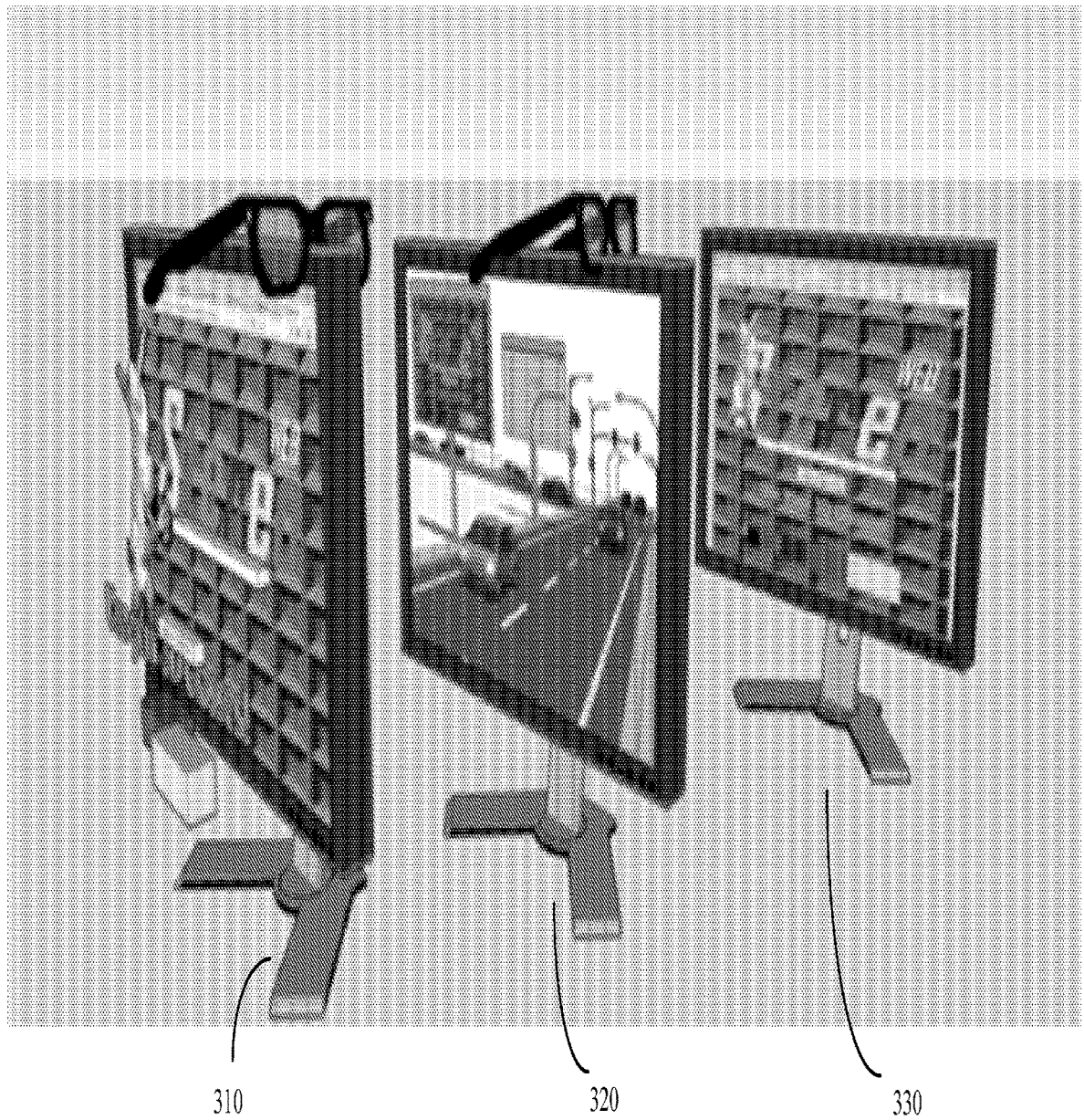
FIG. 3 is a side-by-side comparison of a 2D-rendered webpage (right) using a common web browser, a 3D projection (middle) of the same webpage in a Metaverse (immersive environment like Second Life, a game or a simulator) using a 3D platform and a SWP rendering of the 2D-rendered image (left) rendered in accordance with an exemplary embodiment. using the proposed stereo plugin or a standalone browser. The difference between the one on the middle (state of the art) and the proposed method shown at left (beyond the state of the art) is the way depth cues are applied in the html. The middle projects the whole webpage as one entity and the depth feeling is given by the surroundings (outside of the webpage which is shown as a paneled advertisement). The left one deconstructs the html page in order to manipulate html elements differently and reconstructs on-the-fly the left and right images to give the illusion of depth without the need to have any surroundings.

FIG. 3 is a side-by-side comparison of a 2D-rendered webpage using a common web browser 330, a 3D projection 320 of the same webpage in a Metaverse (immersive environment like Second Life, a game or a simulator) using a 3D platform and a SWP rendering 310 of the 2D-rendered image 330 rendered in accordance with an exemplary embodiment using the proposed stereo plugin or a stand-alone browser.

A fundamental difference between 320 and the proposed result 330 on the left is the way depth cues are applied in the html.

In projection 320, the whole webpage as one entity and the depth feeling is given by the surroundings (outside of the webpage which is shown as a paneled advertisement). The present approach (SWP rendering 330) deconstructs the html page instead and manipulates html elements in a unique way to reconstruct the original 2D representation (on-the-fly) as two distinct left and right channel images. This in turn gives an "illusion" of depth without having to provide surroundings objects as in the case with 3D projection 320.

It is well appreciated that stereo vision is more useful for relative depth comparisons—such as display of neighbouring visual HTML elements—than is the case of absolute judgments. In this, the proposed approach allows users to better perceive differences between structural components presented on a web page.

All those changes described earlier are crystallized as HTML+CSS changes in the intermediate source code. It should be noted that this source code is not visible and it is created dynamically by computer driven procedures.

The present idea is to dynamically provide a way to calculate properties which would be impossible for a web designer to be able to calculate on the fly, or at least as quickly as is the case with the present approach.

It should be appreciated that all the functionality presented herein and discussed as browser, browser plug-in, and or browser "add-on" functionality may be easily incorporated in off-the shelf web-authoring tools such as Dreamweaver, automatic website design tools and the like site builders. Without such tools, a web designer would need excessive time and paid effort to calculate properties of HTML elements in order to develop the right CSS styles (as new extensions of CSS propose).

Figure 4:
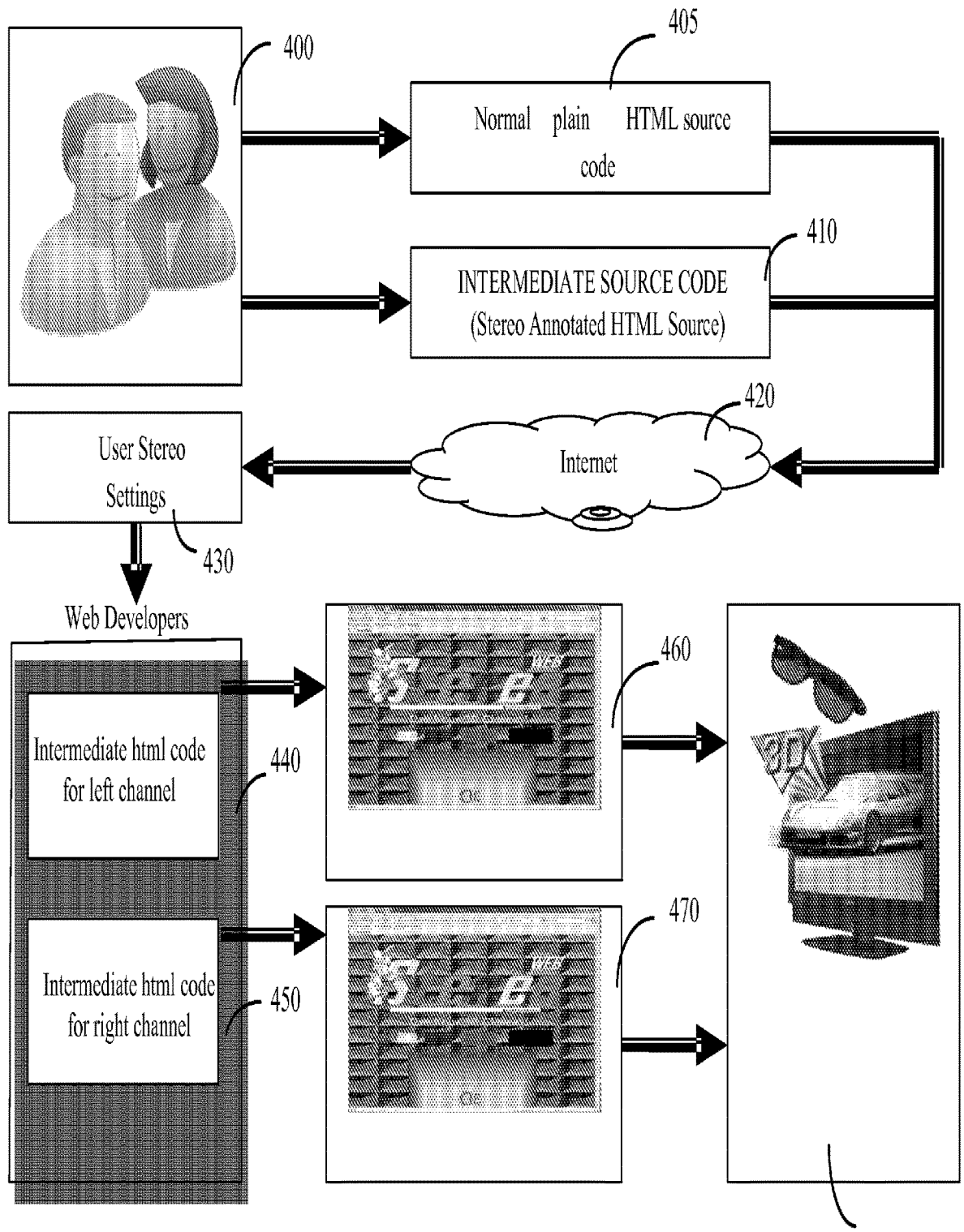
FIG. 4 is a high level functional block diagram showing the operational flow and image rendered generation in accordance with an exemplary embodiment.

FIG. 4 is a high level functional block diagram showing the operational flow and image rendered generation in accordance with an exemplary embodiment.

Block 400 is a community of people surfing the web. The idea in this flow diagram is that users place requests to download typical web page content and have it displayed as a SWP form. Typically the site exists as 2D HTML source on a server. In one scenario, the SWP is generated by a local plug-in or the like on a user computer or like client device. In this fact scenario, the client device downloads a 2D page 405 over the internet (420) or like medium, where the information sits on a cloud-based network, or like storage device. The plug-in is used in the computer to stereo enhance the code as a result of which generate left and right channels (440, 450) of transmittable data 460, 470. Each image pair is a stereoscopic reproduction, generated on the fly from the 2D content received by the computer and displayed using conventional techniques on monitor 480.

In a related scenario, rather than convert the 2D content on the fly, the site HTML content exists in stereo annotated form already. This way, if the client browser is configured to be able to interpret the depth cue tags that have been introduced into the original HMTL source code, then it will be able to generate stereoscopic webpages (330) directly from the browser. If the browser is not so equipped, then the page is presented in 2D form (330) instead.

User Stereo settings block 430 allows the transformation of both 2D source as well as intermediate source to take into account any unique use profiles that may have been defined a priori, so as to generate SWPs that meet user's visual and aesthetic preferences.

Figure 5:
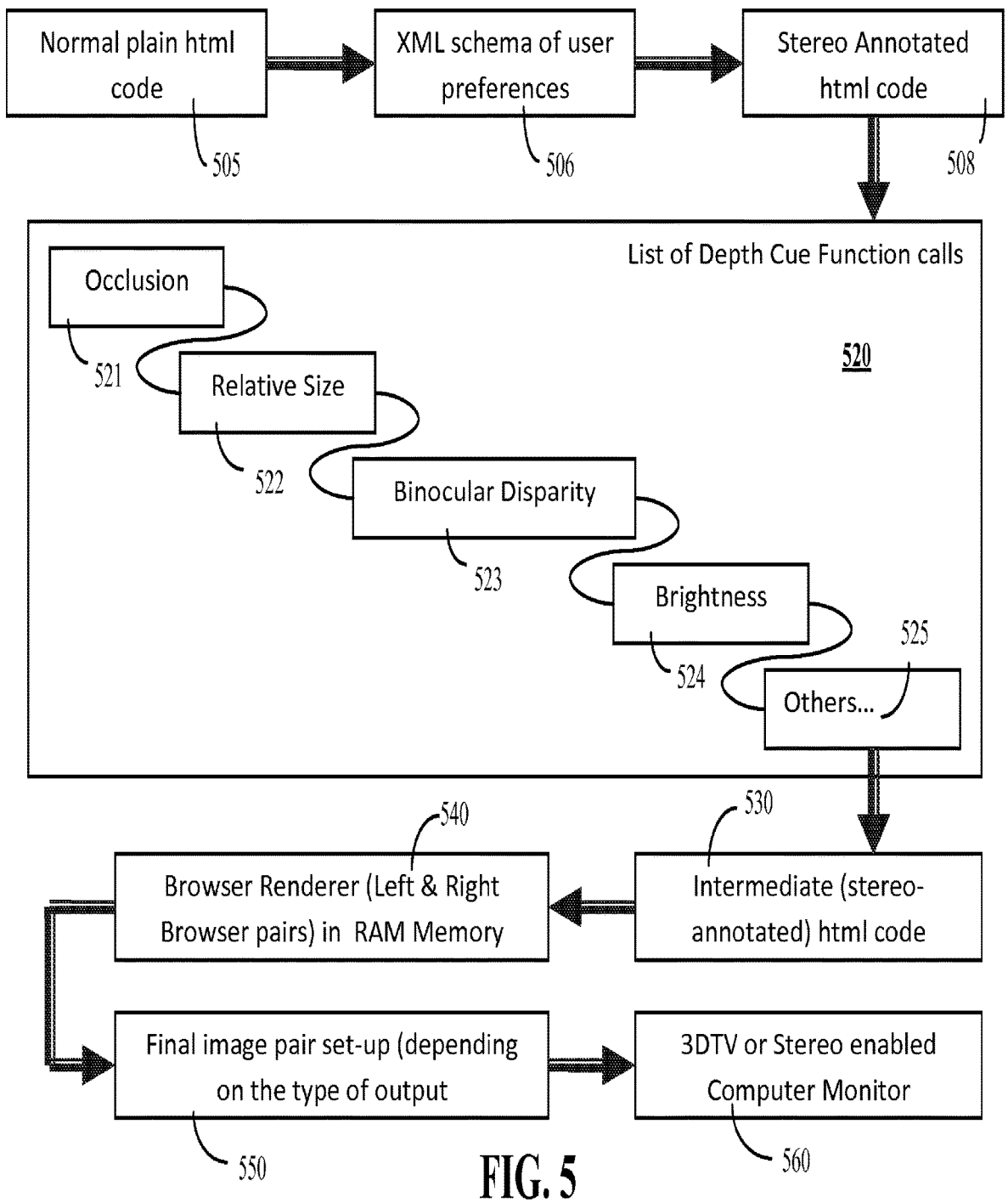
FIG. 5 depicts the overall architecture and data flow from source (developers) to destination (output projection system) as proposed herein.

FIG. 5 depicts the overall architecture and data flow from source (developers) to destination (output projection system) as proposed herein.

At step 505, 2D webpage content is identified. An XML schema of user preferences 506 is then applied to the 2D webpage content. This results in a stereo annotated HTML code (508) rendition of the original 2D content. As a next step, a list of depth cue function calls 520 are identified. These function calls may include cues for (i) occlusion 521, (ii) relative size 522, (iii) binocular disparity 523, (iv) brightness (524), and other types of depth cue 525 (see FIG. 1). Intermediate source code 530 is generated as an output result after applying function calls 520. This intermediate code is then ready for browser renderers to generate left and right browser pairs with the help of sufficient memory (RAM) to assist with the rendering process.

Depending on the type of client device, the browser renderer result may need to be further manipulated 550 to adjust each rendered pair to accommodate the specific display 50 of the client device, or in some cases to adjust the stereo enhanced content so that it is optimized (interlaced) for display on a 3DTV or stereo enabled computer monitor 560.

The proposed method solves the problem of computer-based stereo web content development and rendering. It is a two way problem state, where the first goal is to produce stereoscopic information from HTML elements before even they are in a 2D image. The second goal is to render the final result by producing an intermediate HTML+CSS source code which is automatically consumed by the rendered process using a list of depth functions as described earlier. One possible variation of this technique places the Point Zero parallax (FPS) to infinity so all objects appear in front of the screen. It seems that human perception prefers Negative Parallax as projection of objects in front of the screen appears more impressive even there are violations in the edges of the leftmost and rightmost elements. This phenomenon (reported as Floating Stereoscopic Windows) can be reduced by applying a cutting mask for the left edge of the left most elements and for the right edge of the rightmost elements.

Some of the ways in which the proposed method may be implemented include but are not limited to that of (i) an Add-on or Plugin for widely used web browsers (like Microsoft Internet Explorer, FireFox, Google Chrome, Opera, etc.), (ii) as a stand-alone 3D Stereo Browser. Some of the ways in which the proposed method may be implemented include but are not limited to that of (i) an Add-on for browsers, (ii) as a stand-alone 3D Stereo Browser and/or (iii) as a Plugin for FireFox, Opera, Google Chrome and other existing or future web browsers.

Figure 6:
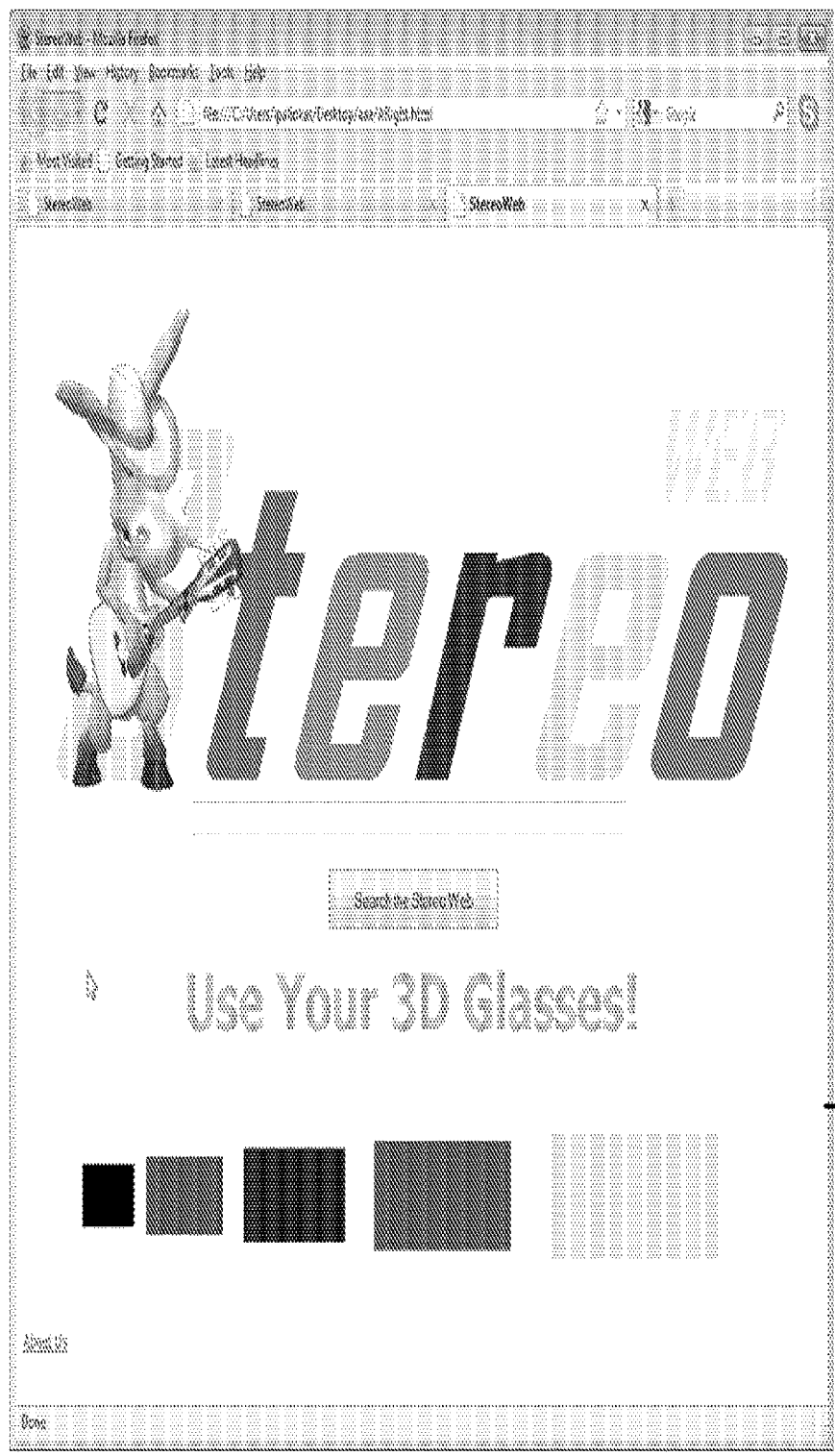
FIG. 6 is an example 2D rendered webpage generated using a conventional browser.

FIG. 6 is an example 2D rendered webpage 600 generated using a conventional browser. The following code listing shows the underlying HTML code associated with the webpage in FIG. 6.

```
<!DOCTYPE HTML PUBLIC "-//W3C//DTD XHTML 1.0 Transitional//EN"
"http://www.w3.org/TR/xHTML1/DTD/xHTML1-transitional.dtd">
<HTML xmlns="http://www.w3.org/1999/xHTML">
<head>
<link rel="icon" type="image/png" href="images/favicon.ico" />
<meta http-equiv="Content-Type" content="text/HTML; charset=utf-8" />
```

-continued

```
<title>PlainWeb</title>
<link href="style.css" rel="stylesheet" type="text/css" />
<script type="text/javascript">
</script>
<style type="text/css">
.style1 {
        text-align: center;
        vertical-align:middle;
}
</style>
</head>
<body style="
background-image:url('BGs/StereoBackGround1Left.png')">
<img src="images/donkey guitar.gif" alt="donkeyguitar" />
<br/>
<div style="text-align:center; border:0px; border-color:black;
border-style:solid">
<img id="logo_image" src="images/Logo5.png" alt="Logo"
width="860" height="340"/>
</div>
<form>
    <div class="style1">
    <input type="text" name="keywords" size="80"
    style="stereo:30"/>
    <br/>
    <br/>
    <input type="submit" value="Search the Stereo Web"
style="stereo:20; width:200px; height:40px"/>
    </div>
</form>
<div id="MyText" style="text-align:center">
<h1 style="color:orange; font-size:50px">Use Your 3D Glasses!</h1>
</div>
<br/>
<br/>
<table align="center">
<tr>
<td>
<div id="E" style="background-color:black; width:60px; height:40px;
text-align:center">
</div>
</td>
<td>
<div id="D" style="background-color:green; width:90px; height:50px;
text-align:center">
</div>
</td>
<td>
<div id="C" style="background-color:blue; width:120px; height:60px;
text-align:center">
</div>
</td>
<td>
<div id="B" style="background-color:red; width:160px; height:70px;
text-align:center">
</div>
</td>
<td>
<div id="A" style="background-color:yellow; width:200px; height:80px;
text-align:center">
</div>
</td>
</tr>
</table>
<br/>
<br/>
<div>
<a href="http://www.somelink.com">About Us</a>
</div>
<br/>
</body>
</HTML>
```

If a developer wanted to transform the 2D page 600 shown in FIG. 6 into a SWP his first action would be to retrieve the HTML source code listing of this page shown in the above listing.

In the case where a plug-in, advanced browser, or add-on (collectively, the "stereo-annotating tools") is used to generate the stereo-enhanced webpage (SWP), this same listing serves as the sole image specific input source to such stereo-annotating tools.

Figure 7:
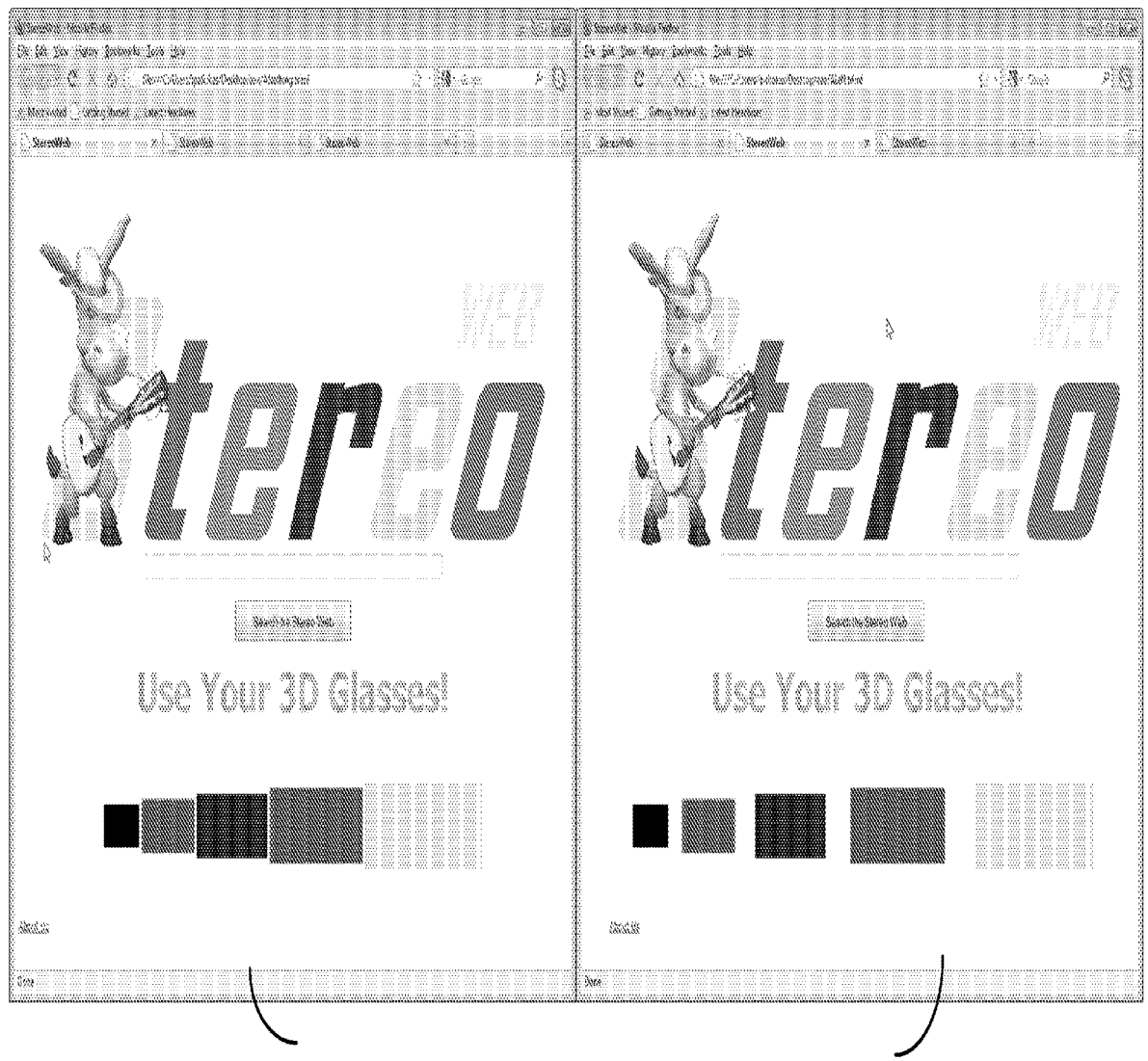
FIG. 7 shows left and right channel images for stereo-enhanced projections of the 2D-image shown in FIG. 6 in accordance with an exemplary embodiment.

FIG. 7 shows left and right channel images 710, 720 for stereo-enhanced projections of the 2D-image 600 shown in FIG. 6 in accordance with an exemplary embodiment.

Figure 8:
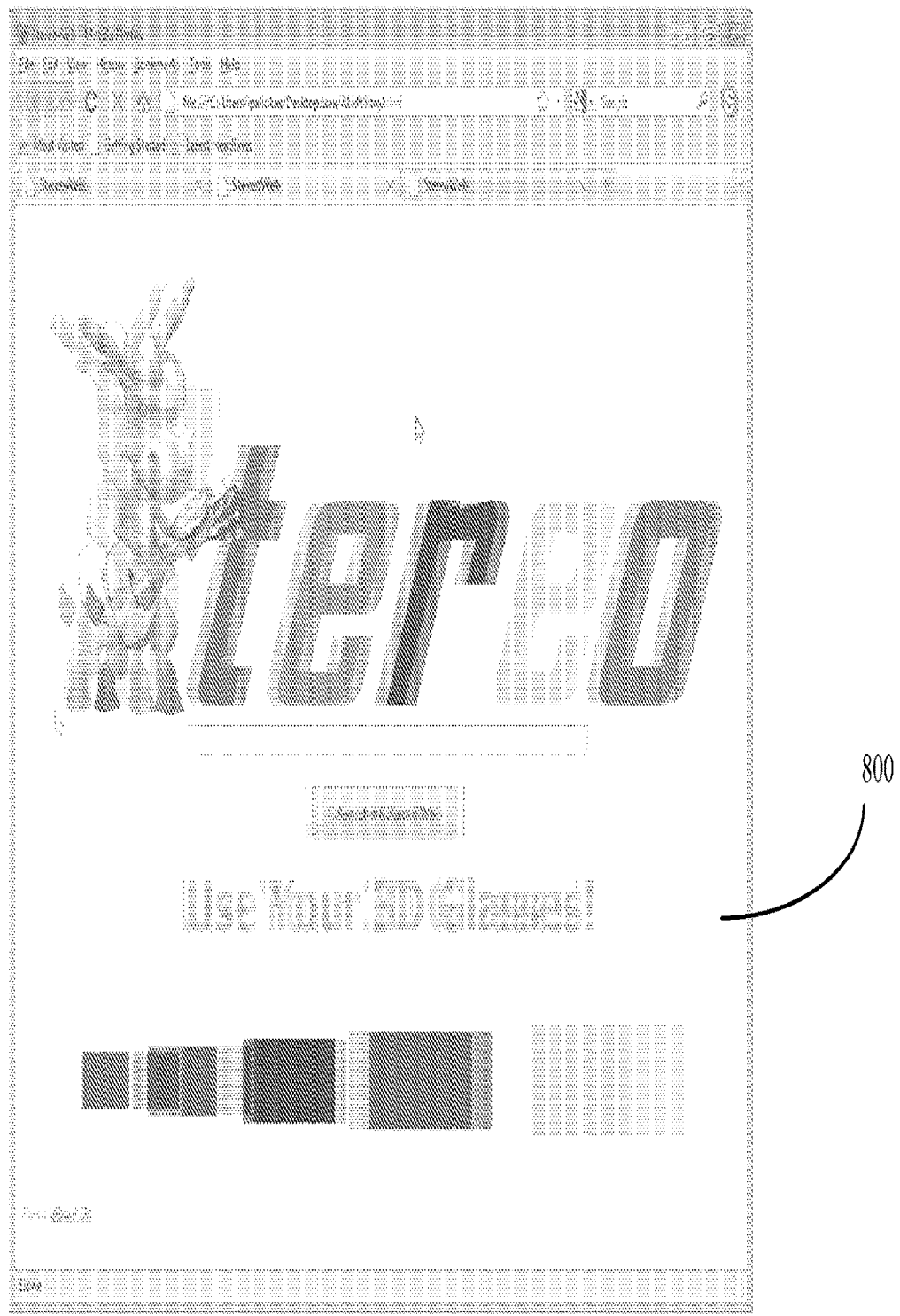
FIG. 8 is a stereo-enhanced view of the 2D image in FIG. 6 which when viewed through special glasses in a stereo-enabled monitor gives the stereoscopic effect of the presently proposed approach.

FIG. 8 is a stereo-enhanced view 800 of the 2D image 600 in FIG. 6 which when viewed through special glasses in a stereo-enabled monitor gives the stereoscopic effect of the presently proposed approach. The rendering here was generated by employing a couple (left-right) of layers predicable with a digital image processing software tool. Each of the left and right layers are shown at some level of transparency (e.g. 50%), which generates the fuzziness in perspective. The spatial offset of the two images is clearly visible.

The side-by-side images 710, 720 of FIG. 7 are merely screen captures stored in RAM memory. This is not the actual output as those two images reside only in memory for a very short period of time.

As for the rendering of FIG. 8, the two (left-right) channels have been interlaced into one in order to be presented by the 3D monitor.

The intermediate source code listing reproduced below is provided to show an example of a stereo enriched version of an intermediate source code for the stereo image (SWP) shown in FIG. 8.

Here, the <stereo></stereo> HTML directives indicate an element or a group of HTML elements that are marked as stereo enabled. This intermediate stereo-enriched HTML code is either transmitted from the web server to the client (plug-in approach) or is otherwise automatically created by the plug-in and the default user profile during web navigation.

```
<!DOCTYPE HTML PUBLIC "-//W3C//DTD XHTML 1.0
Transitional//EN"
"http://www.w3.org/TR/xHTML1/DTD/xHTML1-transitional.dtd">
<HTML xmlns="http://www.w3.org/1999/xHTML">
<head>
<link rel="icon" type="image/png" href="images/favicon.ico" />
<meta http-equiv="Content-Type" content="text/HTML; charset=utf-8" />
<title>StereoWeb</title>
<link href="style.css" rel="stylesheet" type="text/css" />
<script type="text/javascript">
</script>
<style type="text/css">
.style1 {
        text-align: center;
        vertical-align:middle;
}
</style>
</head>
<body style="
background-image:url('BGs/StereoBackGround1Left.png')">
<stereo zindex="36px" zpp="1" step="5">
<img src="images/donkey guitar.gif" alt="donkeyguitar" />
</stereo>
<br/>
<stereo zindex="30px">
<div style="text-align:center; border:0px; border-color:black;
border-style:solid">
<img id="logo_image" src="images/Logo5.png" alt="Logo"
width="860" height="340"/>
</div>
</stereo>
<stereo zindex="24px">
<form>
    <div class="style1">
    <input type="text" name="keywords" size="80"
style="stereo:30"/>
    <br/>
    <input type="submit" value="Search the Stereo Web"
style="stereo:20; width:200px; height:40px"/>
    </div>
</form>
</stereo>
<stereo zindex="14px">
<div id="MyText" style="text-align:center">
<h1 style="color:orange; font-size:50px">Use Your 3D Glasses!</h1>
</div>
</stereo>
<br/>
<br/>
<table align="center">
<tr>
<td>
<stereo zindex="10px">
<div id="E" style="background-color:black; width:60px; height:40px;
text-align:center">
</div>
</stereo>
</td>
<td>
<stereo zindex="20px">
<div id="D" style="background-color:green; width:90px; height:50px;
text-align:center">
</div>
</stereo>
</td>
<td>
<stereo zindex="30px">
<div id="C" style="background-color:blue; width:120px; height:60px;
text-align:center">
</div>
</stereo>
</td>
<td>
<stereo zindex="40px">
<div id="B" style="background-color:red; width:160px; height:70px;
text-align:center">
</div>
</stereo>
</td>
<td>
<stereo zindex="50px">
<div id="A" style="background-color:yellow; width:200px; height:80px;
text-align:center">
</div>
</stereo>
</td>
</tr>
</table>
<br/>
<br/>
<div>
<a href="http://www.somelink.com">About Us</a>
</div>
<br/>
</body>
</HTML>
```

Figure 9:
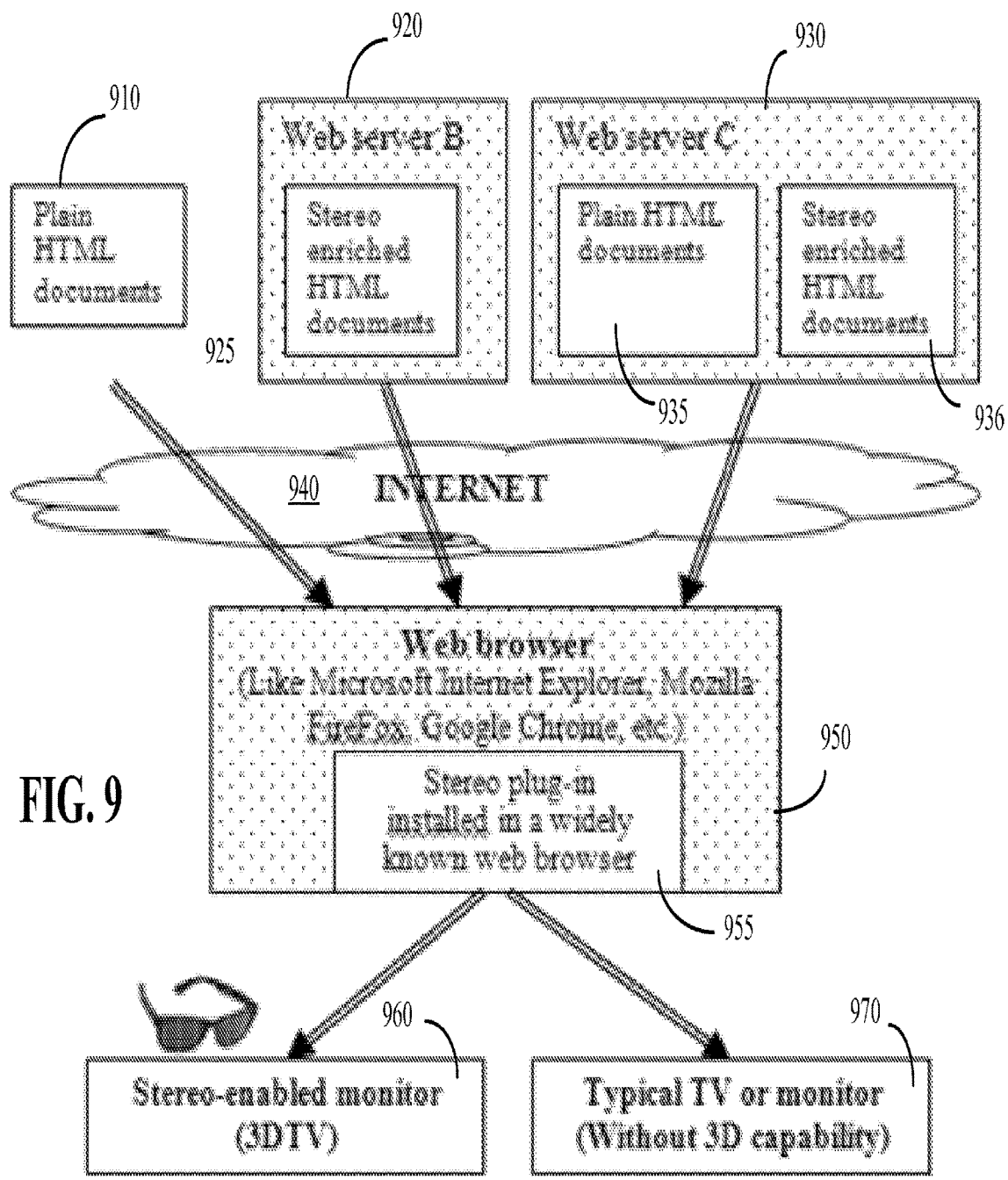
FIG. 9 shows various use case scenarios of the proposed methodologies.

FIG. 9 shows various use case scenarios of the proposed methodologies. Two modes in particular are presented: (i) stereo effect is applied whenever a stereo enriched web page is loaded into the plug-in, (ii) stereo effect is applied even when the designer of a webpage is not aware of the plug-in being installed in the user's web browser by automatic creation of stereo content.

As shown in FIG. 9, a simple (plain) HTML document 910 can be transferred through the common internet protocols 940—as usual—into the web browser 950. Referring to FIG. 9, when a stereo plug-in 955 is properly installed and activated, then the extra stereo content is automatically created based on user's profile and embedded into the HTML document resulting in the stereoscopic effect.

Alternatively, when the plug-in functionality is missing or disabled by the user, then the plain HTML document stored in server A (920) is presented normally.

In yet a further scenario, a stereo-enriched HTML document (936), shown as coming from server B (930), can be downloaded through the common internet protocols (940) without side-effects and directed to the plug-in (955). The plug-in 955 takes this code and produces a pair of different rendered images for the two eyes based on the stereo content and predefined settings made by the designer.

A designer's stereo enrichment embedded into the HTML document is optionally treated by the plug-in as of highest order and the user's profile comes second in this case.

Where the stereo-enriched document is projected by a normal web browser without any problems, the extra stereoscopic data will be ignored by the browser.

In a further scenario depicted in FIG. 9, where a given web server contains both stereo-enriched and plain HTML documents (930), each document follows a separate route just as if it was stored in a separated server. A plain HTML document (910, 935) going through a disabled stereo plug-in (955), finally appears as twin images in the 3DTV with no differences between the left and right channels.

In yet another scenario, a mixed HTML web page (served from server C) contains parts of stereo-enriched (936) and plain HTML documents (935). This page will appear as stereo enabled assuming that the end user is willing to enjoy the remaining stereo content. The missing parts of stereo content in this case are automatically filled up by dynamically created stereo enhancing functionality, defined in part by user set preferences.

Figure 10:
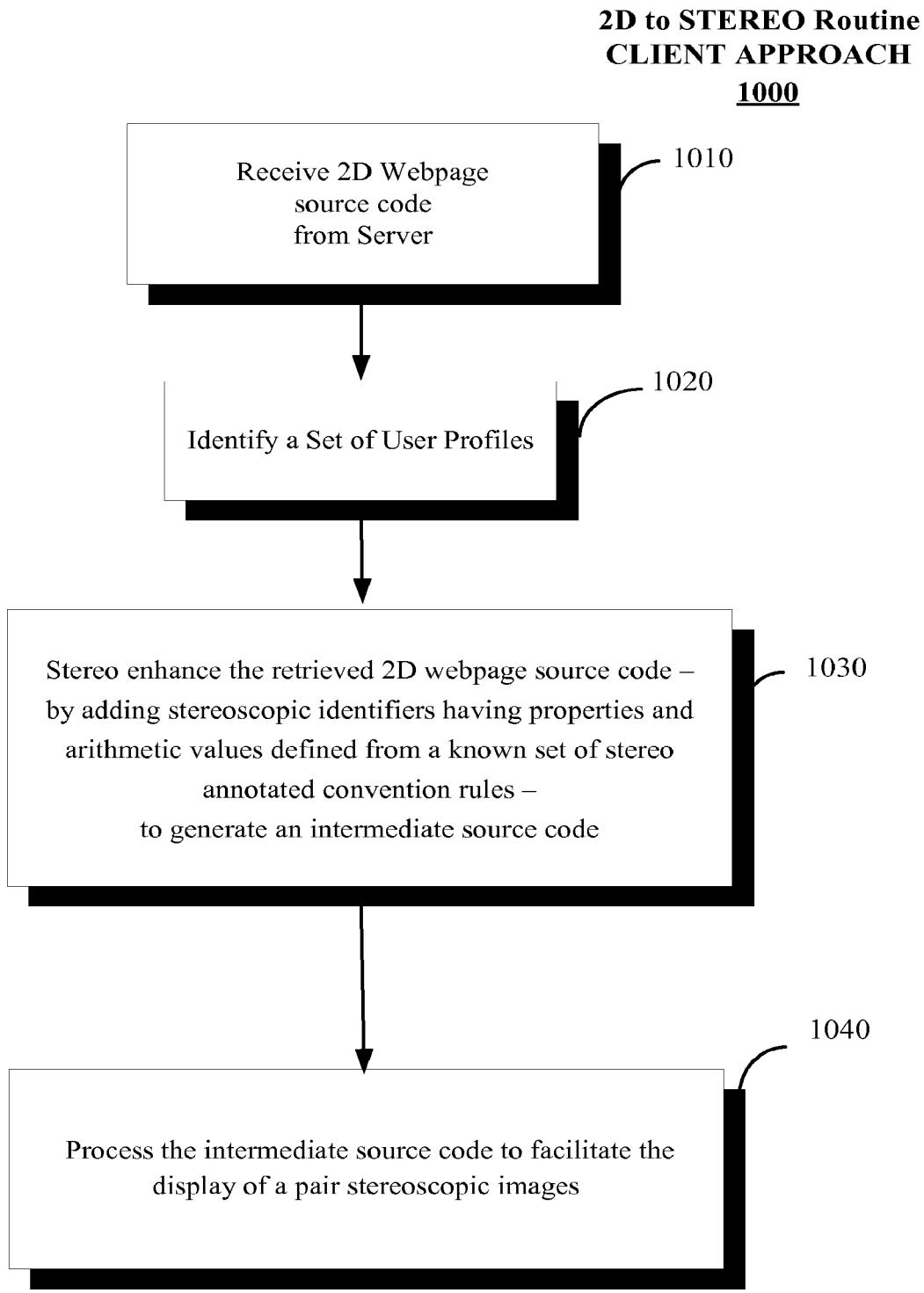
FIG. 10 is a high level operational flow diagram of a routine to convert 2D web pages directly and entirely from a client device plug-in (client approach).

FIG. 10 is a high level operational flow diagram of a routine 1000 to convert 2D web pages directly and entirely from a client device plug-in.

In a conventional manner, a computer user types a domain name/address on his keyboard or like input device. The local browser retrieves the 2D webpage source code from a remote server where the site sits (1010). Before initiating any conversion efforts, the client device identifies any unique set of client device profiles associated with the computer user (1020). The client device plug-in takes the 2D webpage source content, and the user profile info, and uses this information to create the stereo enriched/enhanced code (intermediate source code) 1030. In turn, the browser receives the intermediate code and processes it to generate a rendered pair of stereoscopic images (1040) (client approach).

Figure 11:
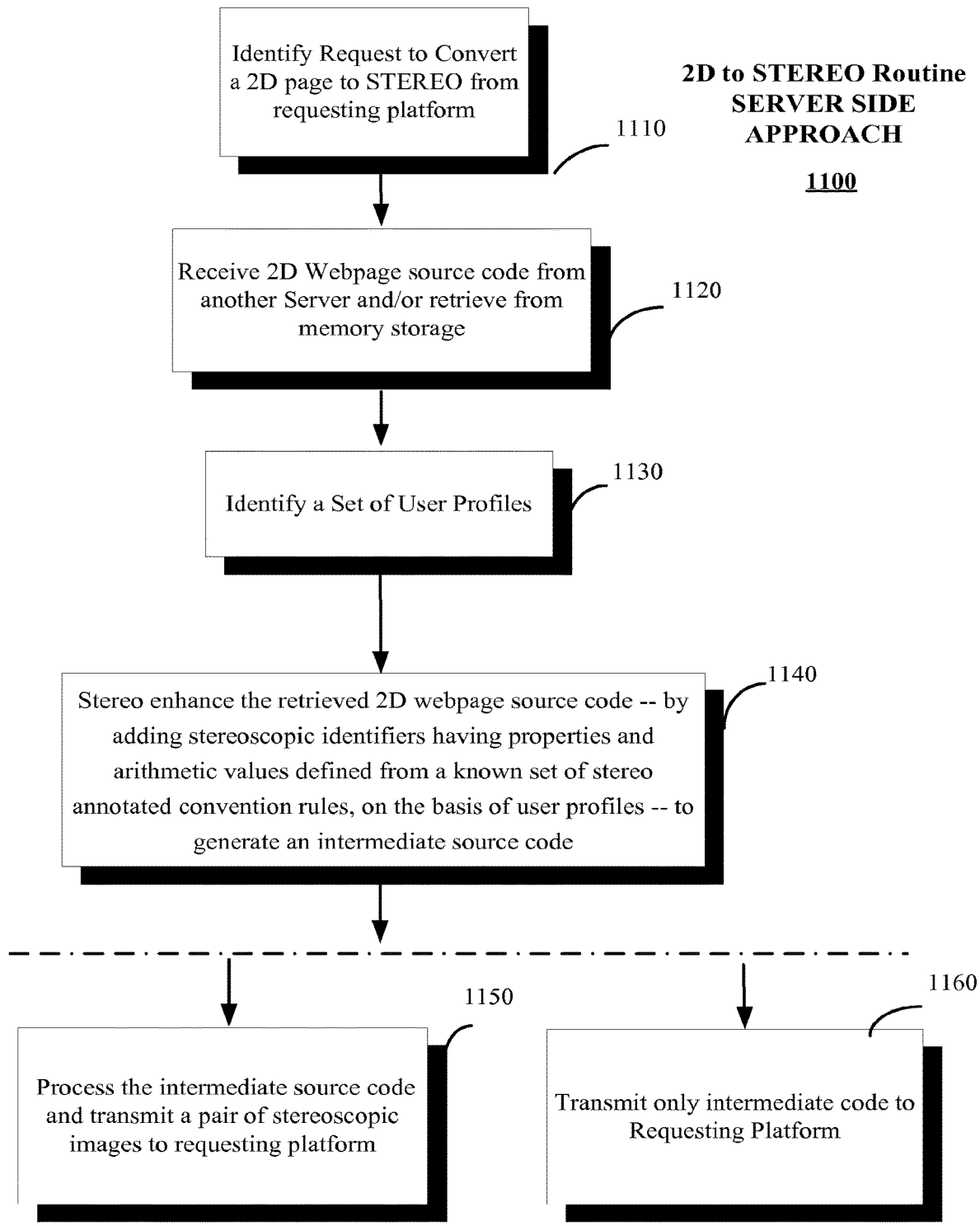
FIG. 11 is similar to the routine in FIG. 10, except the user profile and/or stereo enhancing is provided by a remote device (server-side approach).

FIG. 11 is similar to the routine in FIG. 10, except the user profile (1110) and/or stereo enhancing (and/or full generation and transmission of ready to display SWPs) is provided by a remote device (server-side approach). In one aspect, a client device browser receives server-stereo-enhanced source code from the server to render the pair of images necessary to generate the SWP result. In a related approach, the server does the rendering instead and feeds the SWP result as a pair of left right channel information (or in the case of a 3DTV or like stereo-enables monitor, interlaces the images and sends me as such to the client device).

The flow process will now be described in connection with FIG. 11. As a first step (1110), the remote server determines that a request has been placed to convert a 2D page to an SWP. The server, if it does not already have the page in storage, it will go out and retrieve it (1120). Assuming the requesting party/platform has provided any relevant user profiles (as such have been defined above), this information together with the 2D page HTML source code undergo stereo-enhancing (1130). The result is the generation of intermediate HTML source code. At this point, depending on requester needs or instructions, the intermediate source code may be sent as is to the requester (1160), or alternatively, the intermediate source code is fed through a browser rendering module at the server, where left and right images are generated corresponding to the SWP page (1150).

Figure 12:
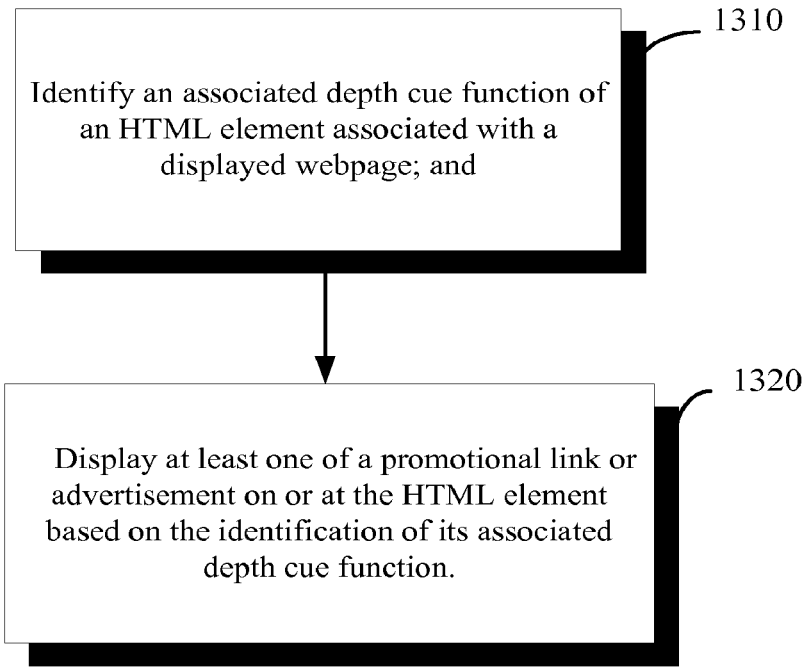
FIG. 12 is a highly level operational flow diagram of monetization routine 1200 in accordance with a further embodiment

FIG. 12 is a highly level operational flow diagram of monetization routine 1200 in accordance with a further embodiment. Routine 1300 may reside at a client device for example and configured to identify depth cue functions in HTML element within a displayed SWP or 3D webpage (1310), and in response thereto cause a promotional link or advertisement to be displayed (1320) to take advantage of the additional depth information for monetization purposes. It is contemplated that an end user is free to select certain HTML elements and dynamically control the stereo preview at viewing time. For example, a user may opt that a text entry field after a logo image is not to be presented in stereo. A plug-in should be configured to allow for such flexibility at run time.

It is further contemplated that the presently disclosed approaches for rendering stereo-enhanced webpages can be easily integrated in many popular website authoring tools, browsers, as part of next generation hardware and software installations, as well as integrated or made compatible with technologies such as the highly touted Google Glasses, Virtual/Augmented reality applications and product solutions, including mobile and other portable devices employing such technologies, head-mounted displays, and the like.

The above exemplary embodiment descriptions are simplified and do not include hardware and software elements that are used in the embodiments but are not part of the current invention, are not needed for the understanding of the embodiments, and are obvious to any user of ordinary skill in related art. Furthermore, variations of the described system architecture are possible, where, for instance, some servers may be omitted or others added, or their order be modified. Similarly, additional steps may be added or steps be omitted in variations of the exemplary embodiment, or the order of the steps may be modified. These additions, omits, and order modifications do not change the scope of the current invention and are obvious to any user of ordinary skill in related art who reads the exemplary embodiment.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a computer including a browser configured to render a 2D webpage as a stereoscopic webpage, a method comprising:
retrieving, by the browser, the 2D webpage from a remote server;
analyzing HTML tag elements in the HTML code of the 2D webpage to identify relevant HTML tag elements, where identifying relevant HTML tag elements is not based solely on an analysis of objects in the 2D webpage;
ranking depth cues according to importance in viewer depth sensitivity based on a distance from the viewer to a monitor displaying the 2D webpage; and
applying functions corresponding to each depth cue sequentially in rank order to the identified relevant HTML tag elements to generate a copy of each of the relevant HTML tag elements having one or more properties adjusted in response to the functions, where each copy of the relevant HTML tag elements, when placed in the HTML code of the 2D webpage, allows an extended source code instruction set in the browser to render the 2D webpage as a pair of stereoscopic images including a first stereoscopic image having a first polarity and a second stereoscopic image having a second polarity different from the first polarity.

2. The method of claim 1, wherein the HTML code of the 2D webpage and the new tag elements are stored as intermediate source code.

3. The method of claim 2, wherein the browser is configured to retrieve the intermediate source code and employ the extended sourced code instruction set to generate right and left stereoscopic images corresponding to the pair of stereoscopic images by processing the intermediate source code to generate the pair of stereoscopic images in response to a browser instruction from the computer to render the 2D webpage as a stereoscopic webpage.

4. The method of claim 3, further comprising identifying a set of user profiles that define user preferences relating to the rendering of the pair of stereoscopic images, the values associated with the new tag elements being in part based on the set of user profiles.

5. The method of claim 4, wherein the generation of the intermediate source code from the 2D webpage source code is performed automatically by the computer in response to the browser detecting an instruction from the computer to render the 2D webpage as a stereoscopic webpage.

6. The method of claim 1, further comprising identifying a set of user profiles that define user preferences relating to the rendering of the pair of stereoscopic images, the values associated with the new tag elements being in part based on the set of user profiles.

7. The method of claim 1, wherein the analyzing the tag elements and retrieving the new tag elements involves having a remote device receive the HTML code of the 2D webpage, add the tag elements, and return the new code as intermediate source code to the computer for processing by the browser to render the stereoscopic webpage from the 2D webpage.

8. The method of claim 1, wherein the generation of the new tag elements is performed automatically at run time by at least one of a plug-in, add-on, driver, software module, and digital processing unit of the computer.

9. The method of claim 1, wherein the HTML code of the 2D webpage when retrieved from remote server includes new tag elements coded into the HTML code of the 2D webpage, the method further comprising the browser employing the extended source code instruction set to display the 2D webpage as a stereoscopic page using the new tag elements coded into the HTML code of the 2D webpage.

10. The method of claim 9, wherein the new tag elements coded in the retrieved 2D webpage are non-CSS3 type extensions of HTML.

11. The method of claim 1, wherein the stereo annotated convention rules are non-CSS3 HTML extension rules, the method further comprising identifying user-defined HTML convention rules to implement stereo annotation in connection with the process of generating the new tag elements.

12. A non-transitory computer readable medium having encoded thereon instructions for rendering a stereoscopic webpage derived from the HTML code of a 2D webpage downloaded from a remote server, wherein the instructions, when executed by a computing apparatus, cause a browser in the computing apparatus to:
analyze the HTML tag elements in the HTML code of the 2D webpage to identify relevant HTML tag elements, where identifying relevant HTML tag elements is not based solely on an analysis of the objects in the 2D webpage;

rank depth cues according to importance in viewer depth sensitivity based on a distance from the viewer to a monitor displaying the 2D webpage; and apply functions corresponding to each depth cue sequentially in rank order to the identified relevant HTML tag elements to generate a copy of each of the relevant HTML tag elements having one or more properties adjusted in response to the functions, where each copy of the relevant HTML tag elements, when placed in the HTML code of the 2D webpage, allows an extended source code instruction set in the browser to render the 2D webpage as a pair of stereoscopic images including a first stereoscopic image having a first polarity and a second stereoscopic image having a second polarity different from the first polarity.

13. The non-transitory computer readable medium of claim 12, further comprising instructions to identify a set of user profiles that define user preferences relating to the rendering of the pair of stereoscopic images, the values associated with the new HTML tag elements being in part based on the set of user profiles.

14. The non-transitory computer readable medium of claim 12, wherein the instructions to analyze the tag elements and retrieve the new tag elements involves having a remote device receive the HTML code of the 2D webpage, add the tag elements, and return the generated tag elements and the HTML code of the 2D webpage as intermediate source code to the computer to be processed by the browser at the time of rendering the stereoscopic webpage from the 2D webpage.

15. The non-transitory computer readable medium of claim 12, wherein the generation of the new tag elements is performed automatically at run time by at least one of a plug-in, add-on, driver, software module, and digital processing unit of the computer.

16. The non-transitory computer readable medium of claim 12, wherein the HTML code of the 2D webpage when retrieved from remote server includes new tag elements coded into the HTML code of the 2D webpage, the non-transitory computer readable medium further comprising instructions to cause the browser employing the extended source code instruction set to display the 2D webpage as a stereoscopic page using the new tag elements coded into the HTML code of the 2D webpage, where the new tag elements coded in the retrieved 2D webpage are non-CSS3 type extensions of HTML.

17. The non-transitory computer readable medium of claim 12, wherein the stereo annotated convention rules are non-CSS3 HTML extension rules, the non-transitory computer readable medium further comprising instructions to identify user-defined HTML convention rules to implement stereo annotation in connection with the process of generating the new tag elements.

18. A remote server configured to receive a request from a computing apparatus that includes a browser operable to (i) receive intermediate source code generated by the remote server and (ii) based on the basis of an extended source code instruction set and the received intermediate source code from the remote server, to render a stereoscopic webpage of the 2D webpage, the remote server comprising:

means for retrieving the HTML code of the 2D webpage;

means for analyzing the HTML tag elements in the HTML code of the 2D webpage to identify relevant HTML tag elements, where identifying relevant HTML tag elements is not based solely on an analysis of the objects in the 2D webpage;

means for ranking depth cues according to importance in viewer depth sensitivity based on a distance from the viewer to a monitor displaying the 2D webpage;

means for applying functions corresponding to each depth cue sequentially in rank order to the identified relevant HTML tag elements to generate a copy of each of the relevant HTML tag elements having one or more properties adjusted in response to the functions, where each copy of the relevant HTML tag elements, when placed in the HTML code of the 2D webpage, allows an extended source code instruction set in the browser of the requesting computing apparatus to render the 2D webpage as a pair of stereoscopic images including a first stereoscopic image having a first polarity and a second stereoscopic image having a second polarity different from the first polarity; and transmitting the HTML code of the 2D webpage together with the generated copies of the HTML tag elements as the intermediate source code to the requesting computing apparatus.

19. The remote server of claim 18, further comprising means for identifying a set of user profiles that define user preferences relating to the rendering of the pair of stereoscopic images, the values associated with the new HTML tag elements being in part based on the set of user profiles.

20. The remote server of claim 18, wherein the stereo annotated convention rules are non-CSS3 HTML extension rules, the remote server further comprising means for identify user-defined HTML convention rules to implement stereo annotation in connection with the process of generating the new tag elements.

* * * * *